United States Patent
Jiang

(10) Patent No.: US 8,134,993 B2
(45) Date of Patent: Mar. 13, 2012

(54) METHOD AND APPARATUS FOR POLLING TRANSMISSION STATUS IN A WIRELESS COMMUNICATION SYSTEM

(75) Inventor: Sam Shiaw-Shiang Jiang, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 752 days.

(21) Appl. No.: 11/380,654

(22) Filed: Apr. 28, 2006

(65) Prior Publication Data

US 2006/0245410 A1    Nov. 2, 2006

Related U.S. Application Data

(60) Provisional application No. 60/594,697, filed on Apr. 29, 2005.

(51) Int. Cl.
*H04J 3/16* (2006.01)
(52) U.S. Cl. ............................ 370/346; 370/449
(58) Field of Classification Search .................. None
See application file for complete search history.

(56) References Cited

U.S. PATENT DOCUMENTS

| | | | |
|---|---|---|---|
| 6,038,633 A | | 3/2000 | Tavallaei |
| 6,717,927 B2 | | 4/2004 | Chao |
| 2003/0099305 A1* | 5/2003 | Yi et al. ............... 375/295 |
| 2003/0202501 A1* | 10/2003 | Jang ..................... 370/346 |
| 2004/0032851 A1* | 2/2004 | Wu ....................... 370/346 |
| 2004/0052229 A1* | 3/2004 | Terry et al. ............ 370/335 |
| 2004/0148396 A1* | 7/2004 | Meyer et al. .......... 709/227 |
| 2004/0184437 A1* | 9/2004 | Lee et al. .............. 370/349 |
| 2004/0208160 A1* | 10/2004 | Petrovic et al. ....... 370/350 |
| 2006/0013257 A1* | 1/2006 | Vayanos ................ 370/473 |
| 2006/0067238 A1* | 3/2006 | Olsson et al. ......... 370/242 |

FOREIGN PATENT DOCUMENTS

| | | |
|---|---|---|
| CN | 1577256 A | 2/2005 |
| EP | 1 034 681 A1 | 9/2000 |
| EP | 1638237 A2 | 3/2006 |
| EP | 1689134 A2 | 8/2006 |
| JP | 2000-278353 A | 10/2000 |
| KR | 2003-0042847 A | 6/2003 |
| KR | 10-2006-0051278 A | 5/2006 |
| KR | 2006-0051278 A | 5/2006 |
| KR | 10-2008-0090191 A | 8/2006 |
| KR | 2006-0090191 A | 8/2006 |
| TW | 496058 | 7/2002 |
| TW | 571532 | 1/2004 |
| TW | 573405 | 1/2004 |

(Continued)

OTHER PUBLICATIONS

3GPP TSG-RAN2 Meeting #44, XP-002456616, Oct. 2004.

(Continued)

*Primary Examiner* — Rafael Pérez-Gutiérrez
*Assistant Examiner* — Frank Donado
(74) *Attorney, Agent, or Firm* — Klein, O'Neill & Singh, LLP

(57) ABSTRACT

A method for polling transmission status in a wireless communications system includes determining whether a buffer of a transmitter contains at least a packet that has been transmitted, has not been discarded, and has not yet been acknowledged when there is no packet scheduled for transmission or retransmission while a polling procedure is triggered and is not prohibited, selecting a packet in order to transmit a poll, and scheduling the selected packet for retransmission.

1 Claim, 3 Drawing Sheets

FOREIGN PATENT DOCUMENTS

| TW | 578402 | 3/2004 |
|----|--------|--------|
| TW | 1220830 | 9/2004 |
| WO | 99/27741 A1 | 6/1999 |

OTHER PUBLICATIONS

Chen et al., The 14th IEEE 2003 International Symposium on Peraonal, Indoor and. Mobile Radio Communication Proceedings. vol. 1, pp. 926-930.

3GPP TS 25.322 V6.3.0 (Mar. 2005), "Radio Link Control (RLC) Protocol Specification (Release 6)".

3GPP TS 25.322 V6.3.0 (Mar. 2005).

TSG-RAN2 Meeting #19, Sophia Antipolis, France, Feb. 19-23, 2001 (R2-010615).

TSG-RAN2 Meeting #47, Athens, Greece, May 9-13, 2005 (TDOC R2-051263).

TSG-RAN-Working Group 2(Radio L2 and Radio L3), Sophia Antipolis Jul. 5-9, 1999 (TSGR2#5(99)XXX).

TSG-RAN-Working Group 2(Radio Layer 2 and Radio layer 3), Berlin, May 25-28, 1999 (TSGR2#4(99)407).

Email of May 3, 2005 21.52.02 +0800, San Jiang, ASUSTeK contributions to RAN2 #47.

Mailing list—3GPP_TSG_RAN_WG2 Archives—May 2005.

Communication of a notice of opposition on corresponding EP Patent Application No. 06008830.9 from EPO issued on Dec. 8, 2010.

* cited by examiner

METHOD AND APPARATUS FOR POLLING TRANSMISSION STATUS IN A WIRELESS COMMUNICATION SYSTEM

CROSS REFERENCE TO RELATED APPLICATIONS

This application claims the benefit of U.S. Provisional Application No. 60/594,697, filed Apr. 29, 2005, and included herein by reference

BACKGROUND OF THE INVENTION

1. Field of the Invention

The present invention is a method and apparatus for polling transmission status in a wireless communications system, in particular a method and apparatus for avoiding a transmitter being unable to successfully execute a polling procedure to a receiver and avoiding the transmitter executing unnecessary polls.

2. Description of the Prior Art

With the coming of the information age, requirements of mobile voice, data communications, and various mobile services increase each day. Communications systems of prior art are facing bottlenecks of channel usage overflowing and inefficient transmission speeds. Therefore, the third generation mobile communication was developed to have better usage of the frequency spectrum and higher-speed transmission service. Compared to the existing second generation mobile communication technology, the most significant difference with the third generation mobile communication is that the third generation mobile communication uses a Wideband Code Division Multiple Access (WCDMA) protocol for wireless access. The WCDMA protocol provides a more efficient channel usage, outstanding coverage, and high quality, high-speed multimedia data transmission. The WCDMA protocol can satisfy different service requirements of QoS, provide flexible duplex transmission services, and also better communication quality.

With a set of protocol specifications developed by the $3^{rd}$ Generation Partnership Project (3GPP), the Universal Mobile Telecommunications System (UMTS) can provide different levels of transmission quality and operate in different modes according to the different requirements, for instance, Transparent Mode (TM), Unacknowledged Mode (UM), Acknowledged Mode (AM). TM is used for services requiring instant transmission, UM is used for services requiring instant transmission as well as packet orders, and AM is used for robust services requiring data accuracy but not instant transmission.

In AM, for better data accuracy and robustness, Radio Link Control (RLC) layers of a transmitter and a receiver initiate a status report procedure at an appropriate time to have the transmitter poll the receiver so that the receiver transmits a status report unit, or a piggybacked status report unit to the transmitter. The transmitter then executes appropriate procedures according to the status report unit from the receiver. As the transmitter polls the receiver, the transmitter selects a Protocol Data Unit (PDU) and sets a polling bit of the PDU as ON (=1) which requests the receiver to transmit a status report unit. Please refer to the following descriptions for a method for polling (i.e. for carrying an ON polling bit) of a PDU in the prior art.

As stated in the specification 3GPP TS 25.322 V6.3.0 (2005-03), when a poll is triggered and polling is not prohibited and no PDU is scheduled for transmission or retransmission, a PDU that has been transmitted and not yet acknowledged is selected to poll the receiver. Now, if a transmitting window size of the transmitter is larger than or equal to 2048, then a PDU with a sequence number (SN) equal to an SN of a next PDU to be transmitted for the first time minus 1 is selected, and the selected PDU is scheduled for retransmission after setting its polling bit. In contrast, if the transmitting window size of the transmitter is smaller than 2048, then the prior art can select a PDU with an SN equal to an SN of a next PDU to be transmitted for the first time minus 1 or a PDU that has not been acknowledged, and the selected PDU is scheduled for retransmission after setting its polling bit.

The transmitter is able to request the receiver to transmit a status report unit with polling, in order to get the status of PDU receiving by the receiver. With the receiving status, the transmitter decides whether to retransmit PDUs to maintain data robustness. To keep transmission efficient, it is significant to efficiently select a PDU to poll.

On the other hand, in UMTS, if the transmitter transmits a Service Data Unit (SDU) and the SDU is retransmitted for a predetermined number of times unsuccessfully, or the transmitter never receives a positive acknowledgement corresponding to the SDU from the receiver after a predetermined period of time, for better transmission efficiency, the transmitter (with an explicit signaling procedure) discards the SDU and transmits a Move Receiving Window (MRW) super-field to the receiver. After the transmitter discards the SDU, PDUs that carry segments of the SDU and/or the Length Indicator indicating the ending position of the SDU are also discarded. Therefore, the transmitter can improve transmission efficiency to reduce system resources wasted on unnecessary retransmission of PDUs and waiting for acknowledgements.

In some cases, all PDUs stored in a buffer of the transmitter are discarded before being acknowledged, and an error occurs when selecting a PDU to poll. For example, assuming the transmitting window size of the transmitter is 4, and PDUs with SN=0, 1, 2, 3 are transmitted by the transmitter. If the PDUs with SN=0, 1, 2, 3 have been retransmitted for many times or a long time has been elapsed waiting for positive acknowledgements of the PDUs, a discarding procedure of the PDUs is initiated, and the PDUs with SN=0, 1, 2, 3 are discarded from a buffer of the transmitter which means that there are no PDUs in the buffer of the transmitter. Now, assume that there are no PDUs scheduled for transmission, and a poll is triggered and polling is not prohibited. Since the transmitting window of the transmitter is smaller than 2048, the transmitter can select a PDU with an SN equal to an SN of a next PDU to be transmitted for the first time (=4) minus 1 (i.e. a PDU with SN=3), or select a PDU that has not been acknowledged (i.e. any one PDU among PDUs with SN=0, 1, 2, 3), to be a PDU for polling. However, because the buffer of the transmitter has no PDUs inside, an error occurs since the transmitter cannot successfully select a PDU for polling.

In summary, in the prior art, when all PDUs in the buffer of the transmitter are discarded before being positively acknowledged, the transmitter cannot successfully execute a polling operation, which leads to system errors. In fact, in this case, the transmitter does not need to poll the receiver. Therefore, an extra operation lowers an overall transmission efficiency and induces system resource wastage.

SUMMARY OF THE INVENTION

A method for polling transmission status in a wireless communications system includes determining whether there is at least one packet that had been transmitted, not yet discarded, and not yet acknowledged in a buffer of a transmission end when no packet is scheduled for transmission or retransmission and a poll had been triggered and polling is not prohibited. One packet to poll a receiver end is selected and retransmitted if it was determined that the at least one packet exists.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
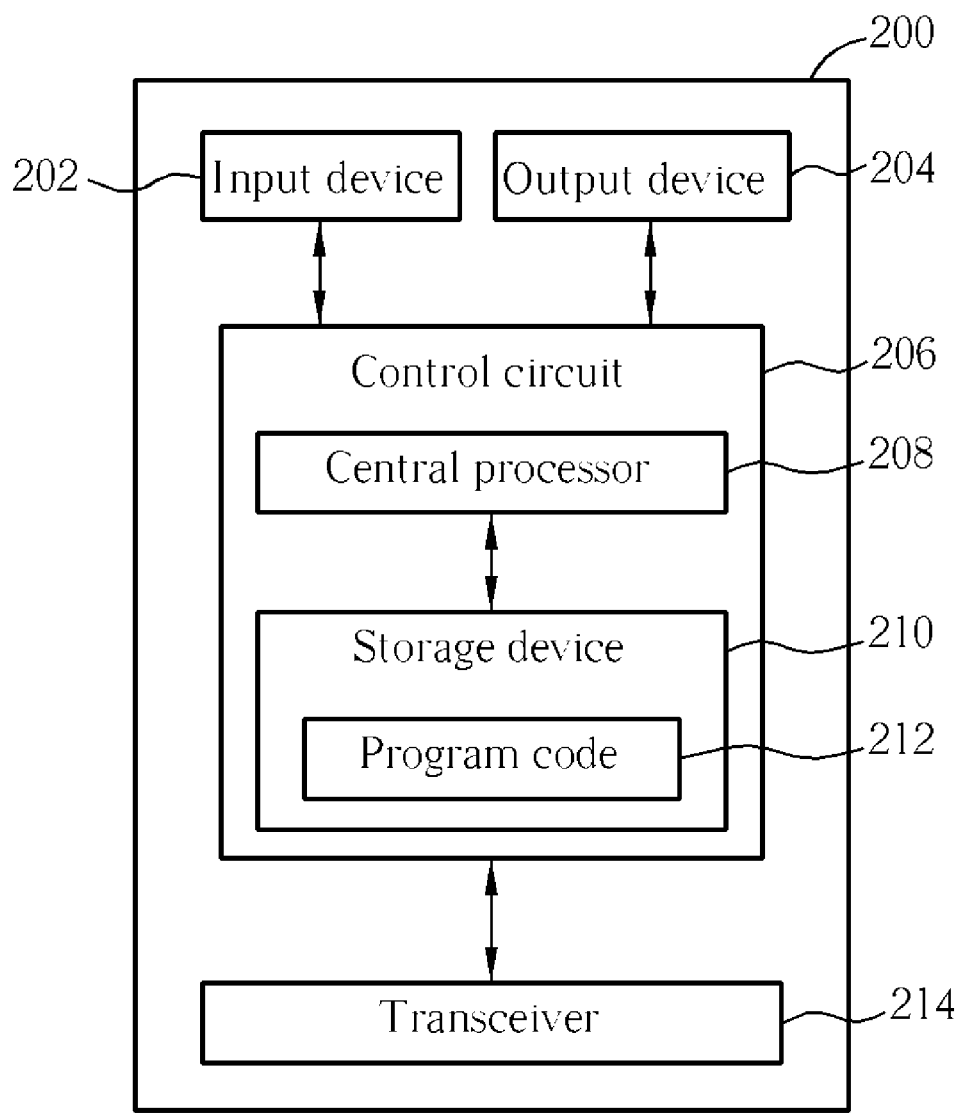
FIG. 2 is a block diagram of a wireless communications transmission device.

Please refer to FIG. 2. FIG. 2 is a block diagram of a wireless communications transmission device (transmitter) 200 used in a wireless communications system. The wireless communications system can be a $3^{rd}$ generation mobile communications system, such as UMTS. For simplicity, FIG. 2 only shows an input device 202, an output device 204, a control circuit 206, a central processor 208, a storage device 210, a program code 212, and a transceiver 214 of the wireless communications transmission device 200. In the wireless communications transmission device 200, the control circuit 206 executes the program code 212 stored in the storage device 210 with the central processor 208, and then controls operations of the wireless communication transmission device 200. The wireless communications transmission device 200 can receive signals input by users through the input device 202, or output signals through the output device 204. The transceiver 214 is used for receiving or transmitting wireless signals. In a structure of a communications protocol, the transceiver 214 is known as a part of a Layer one, whereas the control circuit 206 is an application of Layer two and Layer three.

Figure 3:
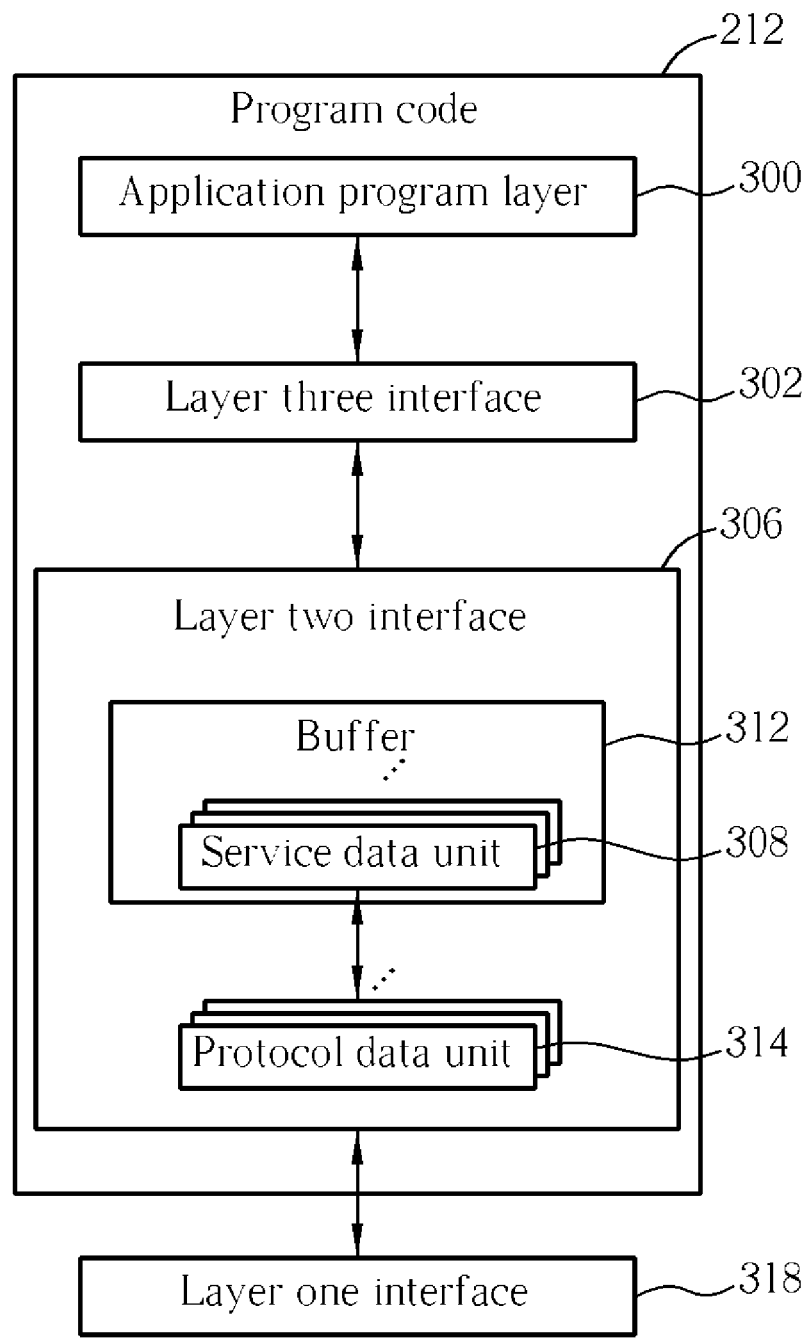
FIG. 3 is a schematic diagram of the program code in FIG. 2.

Please refer to FIG. 3. FIG. 3 is a schematic diagram of the program code 212 in FIG. 2. The program code 212 comprises an application program layer 300, a Layer three interface 302, a Layer two interface 306, and a Layer one interface 318. When transmitting signals, the Layer two interface 306 stores a plurality of Service Data Units (SDUs) 308, which are submitted from the Layer three interface 302, in a buffer 312. Then, the Layer two interface 306 generates a plurality of Protocol Data Units (PDUs) 314 according to the SDUs 308 stored in the buffer 312, and outputs the PDUs 314 generated to a destination through the Layer one interface 318. In reverse, when receiving a radio signal, the signal is received through the Layer one interface 318 and the Layer one interface 318 outputs PDUs 314 to the Layer two interface 306. The Layer two interface 306 restores the PDUs 314 to SDUs 308 and stores the SDUs 308 in the buffer 312. At last, the Layer two interface 306 delivers the SDUs 308 stored in the buffer 312 to the Layer three interface 302.

For data robustness, when in AM the program code 212 initiates a transmission status polling procedure at an appropriate time. The wireless communications transmission device 200 polls a receiver to request the receiver to transmit a status report unit or a piggybacked status report unit, from which the transmitter obtains transmission status. To poll the receiver, the wireless communication transmission device 200 selects a PDU and sets a Polling Bit of the PDU to be ON (=1) in order to request the receiver to transmit a status report unit.

In the present invention, to avoid the transmitter unsuccessfully polling the receiver, the program code 212 can be set to have PDUs not discarded from the buffer 312 when a procedure for discarding PDUs is initiated, and only discarding PDUs from the buffer 312 when an SN following an SN of a last in-sequence acknowledged is updated. Thus, when a procedure for discarding PDUs is initiated due to the PDUs being retransmitted many times or a long time has been consumed waiting acknowledgments of the PDUs, PDUs stored in the buffer 312 are not discarded immediately. Therefore, the wireless communication transmission device 200 can successfully select a PDU for polling without errors. Although a method described above can solve a problem of the prior art, the method is not able to avoid unnecessary polling (i.e. when initiating a SDU discarding procedure before all of PDUs in the buffer have been acknowledged). Thus, the present invention provides another method of polling data transmission status.

Figure 1:
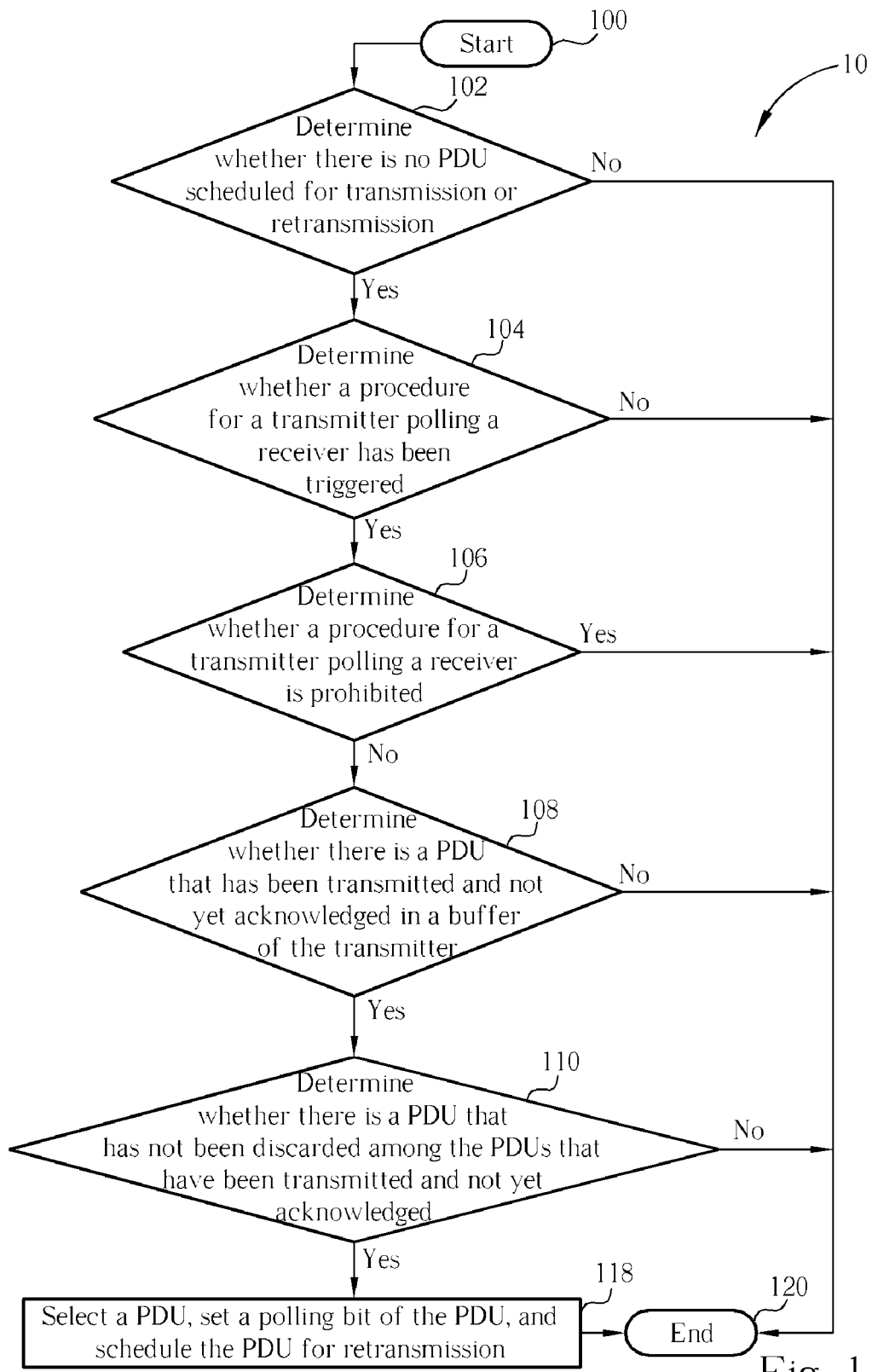
FIG. 1 is a flow chart of determining whether to execute a polling procedure to illustrate an embodiment of the present invention.

Please refer to FIG. 1. FIG. 1 is a flow chart of a procedure 10 illustrating an embodiment of the present invention. The procedure 10 is used for polling data transmission status in a communications system, such as UMTS. The procedure 10 can be compiled into the program code 212, and the procedure 10 comprises following steps.

Step 100: start.

Step 102: determine whether there is no PDU scheduled for transmission or retransmission. If so (i.e., if there is no PDU scheduled for transmission or retransmission), go to step 104; if not, go to step 120.

Step 104: determine whether a procedure for a transmitter polling a receiver has been triggered. If so, go to step 106; if not, go to step 120.

Step 106: determine whether a procedure for a transmitter polling a receiver is prohibited. If not, go to step 108; if so, go to step 120.

Step 108: determine whether there is a PDU that has been transmitted and not yet acknowledged in a buffer of the transmitter. If so, go to step 110; if not, go to step 120.

Step 110: determine whether there is a PDU that has not been discarded among the PDUs that have been transmitted and not yet acknowledged. If so, go to step 118; if not, go to step 120.

Step 118: select a PDU, set a polling bit of the PDU, and schedule the PDU for retransmission.

Step 120: end.

Therefore, according to the procedure 10, the present invention executes a polling procedure, after determining a PDU has been transmitted, not discarded and not yet acknowledged in a buffer, when there is no PDU scheduled for transmission or retransmission, polling a receiver has been triggered, and polling the receiver is not prohibited. When all PDUs in the buffer are discarded before being acknowledged, the present invention does not initiate the polling procedure and hence avoids unnecessary polls.

For example, assuming the transmitting window size of the transmitter is 4, and PDUs with SN=0, 1, 2, 3 have been transmitted by the transmitter. If the PDUs with SN=0, 1, 2, 3 have been retransmitted many times or it has been a long time waiting for positive acknowledgements of the PDUs, a discarding procedure of the PDUs is initiated, and the PDUs with SN=0, 1, 2, 3 are discarded from a buffer of the transmitter which means that there are no PDUs in the buffer of the transmitter waiting for acknowledgement. Now, if there are no PDUs scheduled for transmission, and a poll is triggered and polling is not prohibited, in accordance with the procedure 10, the present invention first determines whether there is a PDU that has been transmitted and not yet acknowledged (i.e. the PDUs with SN=0, 1, 2, 3), then checks if there is a PDU has not been discarded. Since the PDUs with SN=0, 1, 2, 3 have been discarded from the buffer of the transmitter, the procedure 10 does not select a PDU to poll the receiver. In other words, no polling is executed by the procedure 10. In fact, in this situation, no matter what a status report unit from the receiver shows, the transmitter directly sets an SN of a next PDU to be transmitted for a first time to be 4 and sets an SN of a next PDU to be acknowledged to be 4 as the PDUs with SN=0, 1, 2, 3 have been discarded from the buffer, therefore no polling is required. In other words, the procedure 10 of the present invention can avoid prior art errors due to attempted polling when all PDUs stored in the buffer of the transmitter have been discarded before acknowledgment. In addition, the present invention can also avoid unnecessary polls to the receiver so that the present invention can enhance overall transmission efficiency and save system resources.

When applying the present invention, as known by people who are familiar in this field, designers can write (burn-in) the procedures 10 into a storage device (firmware) of a communication device as a program code.

To compare, in the prior art, the transmitter may not successfully select a PDU to poll, which causes system errors. The present invention executes a polling procedure after determining there is a PDU that has been transmitted, not discarded, and not yet acknowledged. A polling procedure means selecting a PDU, setting a polling bit, and scheduling the selected PDU for transmission. Therefore, the present invention solves problems that occurred in the prior art, avoids unnecessary polls to the receiver; and hence improves overall transmission efficiency and saves system resources.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for polling transmission status by a transmitter in a wireless communications system, the method comprising:

determining whether there is a packet scheduled for transmission or retransmission;

determining, when it is determined that there is not a packet scheduled for transmission or retransmission, whether a procedure for polling a status of a receiver has been triggered;

determining, when it is determined that the procedure for polling the status of the receiver has been triggered, whether polling the status of the receiver is prohibited;

determining, when it is determined that polling the status of the receiver is not prohibited, whether there is at least one packet that has been transmitted and not yet acknowledged in a buffer of the transmitter;

determining, when it is determined that there is at least one packet that has been transmitted and not yet acknowledged in the buffer of the transmitter, whether there is at least one packet that has not been discarded among the at least one packet that has been transmitted and not yet acknowledged;

not initiating a polling procedure when all packets among the at least one packet that has been transmitted and not yet acknowledged are discarded before being acknowledged;

selecting, when it is determined that there is at least one packet that has not been discarded among the at least one packet that has been transmitted and not yet acknowledged, a packet of the least one packet that has not been discarded among the at least one packet that has been transmitted and not yet acknowledged;

setting a polling indicator in the selected packet; and scheduling the selected packet with the set polling indicator for retransmission.

* * * * *